(12) United States Patent
Liu et al.

(10) Patent No.: US 7,494,149 B2
(45) Date of Patent: Feb. 24, 2009

(54) SUPPORT STRUCTURE FOR TABLE MACHINE

(75) Inventors: Chia-Sheng Liu, Chiayi County (TW); Chen-Yuan Chen, Taichung County (TW)

(73) Assignee: Durq Machinery Corp., Taichung (TW)

( * ) Notice: Subject to any disclaimer, the term of this patent is extended or adjusted under 35 U.S.C. 154(b) by 154 days.

(21) Appl. No.: 11/717,095

(22) Filed: Mar. 13, 2007

(65) Prior Publication Data
US 2008/0067786 A1 Mar. 20, 2008

(30) Foreign Application Priority Data
Sep. 18, 2006 (TW) ............................... 95134490 A (51) Int. Cl.
*B62B 1/04* (2006.01)
(52) U.S. Cl. .................... 280/639; 280/645; 280/30; 280/47.18
(58) Field of Classification Search ................ 280/639, 280/641, 651, 652, 645, 659, 638, 47.2, 47.27, 280/47.18, 30, 47.19, 47.17; 248/588, 439, 248/631, 647, 676
See application file for complete search history.

(56) References Cited

U.S. PATENT DOCUMENTS

| 1,975,857 | A | * | 10/1934 | McKenney | ..................... | 108/9 |
|---|---|---|---|---|---|---|
| 3,752,527 | A | * | 8/1973 | Ferneau et al. | ................. | 296/20 |
| 4,155,386 | A | * | 5/1979 | Alessio | ..................... | 144/286.1 |
| 4,192,541 | A | * | 3/1980 | Ferneau | ....................... | 296/20 |
| 4,611,823 | A | * | 9/1986 | Haas | .......................... | 280/641 |
| 5,087,013 | A | * | 2/1992 | Gress et al. | ................. | 248/676 |
| 5,560,582 | A | * | 10/1996 | Beelen | ..................... | 248/588 |
| 5,676,124 | A | * | 10/1997 | Lee | ......................... | 125/13.01 |
| 6,435,460 | B1 | * | 8/2002 | Van Cleave et al. | ......... | 248/164 |
| 6,471,236 | B1 | * | 10/2002 | Eskridge | ..................... | 280/648 |
| 6,883,267 | B1 | * | 4/2005 | Pruitt | ........................ | 43/54.1 |
| 7,044,496 | B2 | * | 5/2006 | Holmes | ..................... | 280/639 |
| 7,077,421 | B2 | * | 7/2006 | Wu | .............................. | 280/645 |
| 7,086,434 | B2 | * | 8/2006 | Lee | ......................... | 144/286.1 |
| 7,255,355 | B2 | * | 8/2007 | Chisholm et al. | ............. | 280/30 |
| D550,476 | S | * | 9/2007 | Liu et al. | ..................... | D34/24 |

* cited by examiner

*Primary Examiner*—Christopher P Ellis
*Assistant Examiner*—Bridget Avery
(74) *Attorney, Agent, or Firm*—Bacon & Thomas, PLLC (57) ABSTRACT

A support structure for table machine includes a top frame unit holding a table machine, and a folding mechanism movable between an extended position to support the top frame unit in horizontal and a received position to hold the top frame unit in vertical. The folding mechanism has two first legs and two second legs and two first connecting members respectively pivoted to the top frame unit, and two second connecting members and two third connecting members pivotally coupled between the front legs and the first connecting members such that when the folding mechanism is moved toward the receiving position, the first, second and third connecting members are moved with the second legs toward the first legs smoothly.

10 Claims, 14 Drawing Sheets

SUPPORT STRUCTURE FOR TABLE MACHINE

BACKGROUND OF THE INVENTION

1. Field of the Invention

The present invention relates generally to support means for supporting a table machine, for example, table saw on the floor and more particularly, to a support structure, which is collapsible for storage and capable of transporting the machine supported thereon.

2. Description of the Related Art

Figure 1:
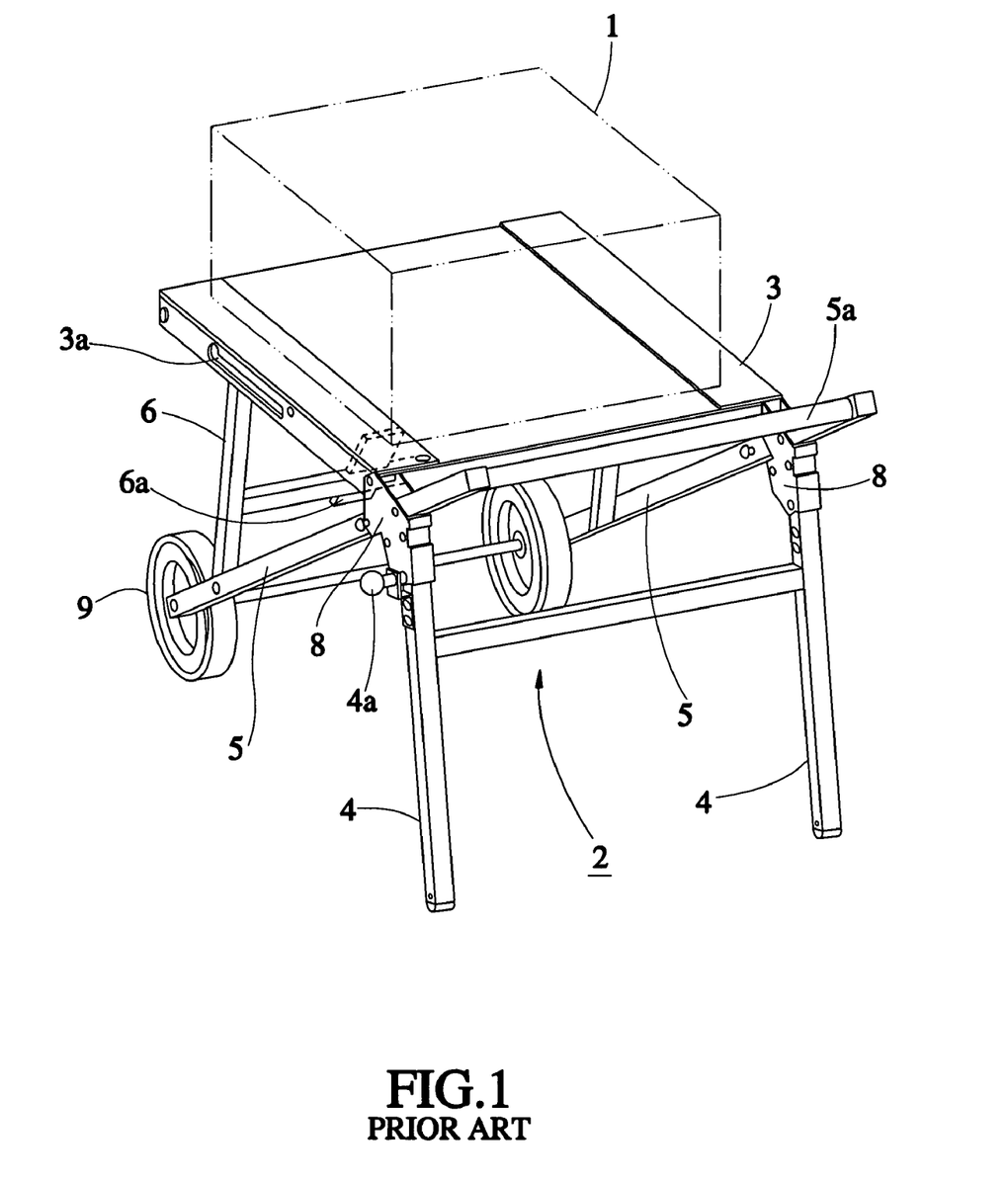
FIG. 1 is a schematic drawing of a mobile table machine stand according to the prior art.
Figure 2:
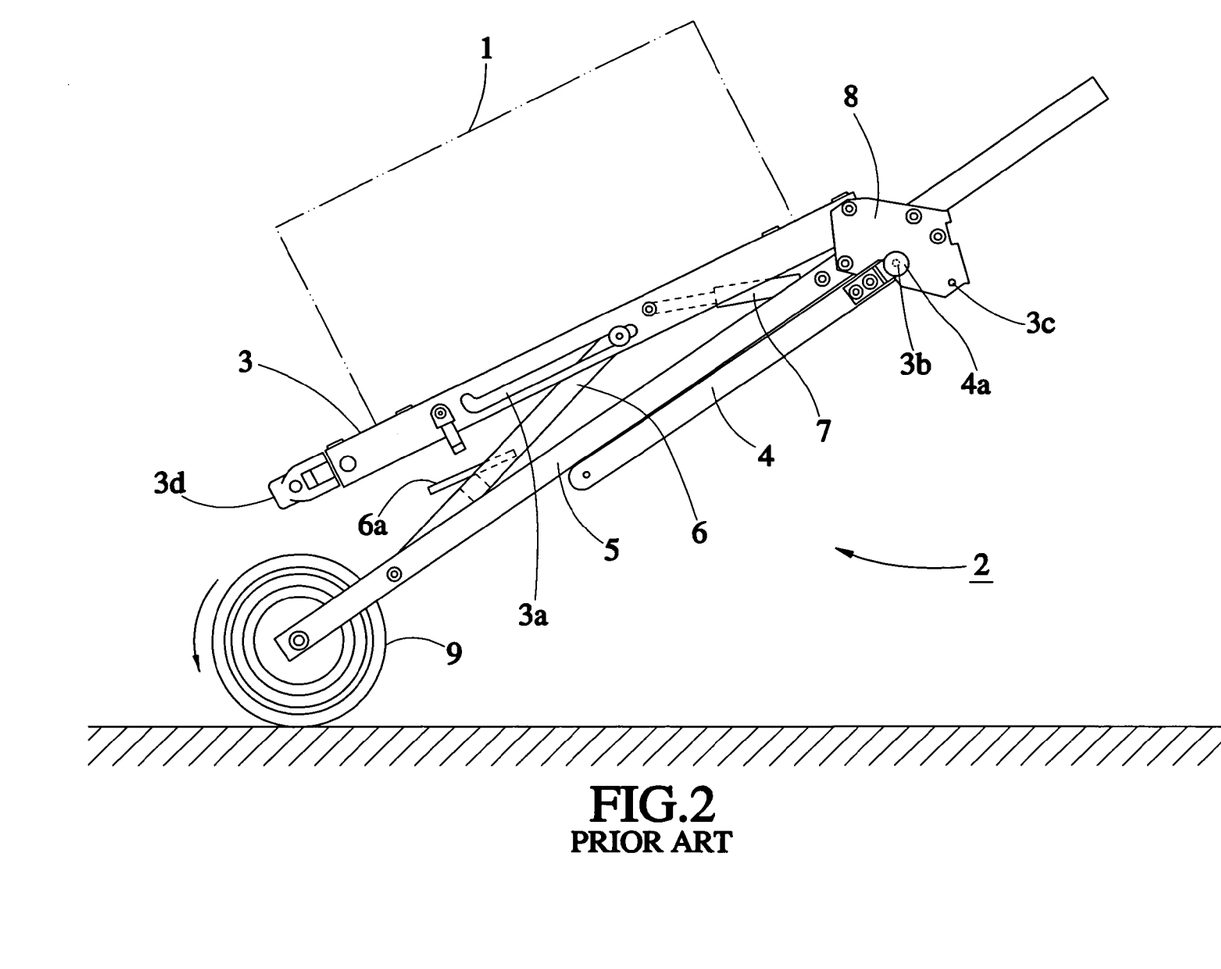
FIG. 2 is a schematic drawing showing a received status of the mobile table machine stand according to the prior art.
Figure 3:
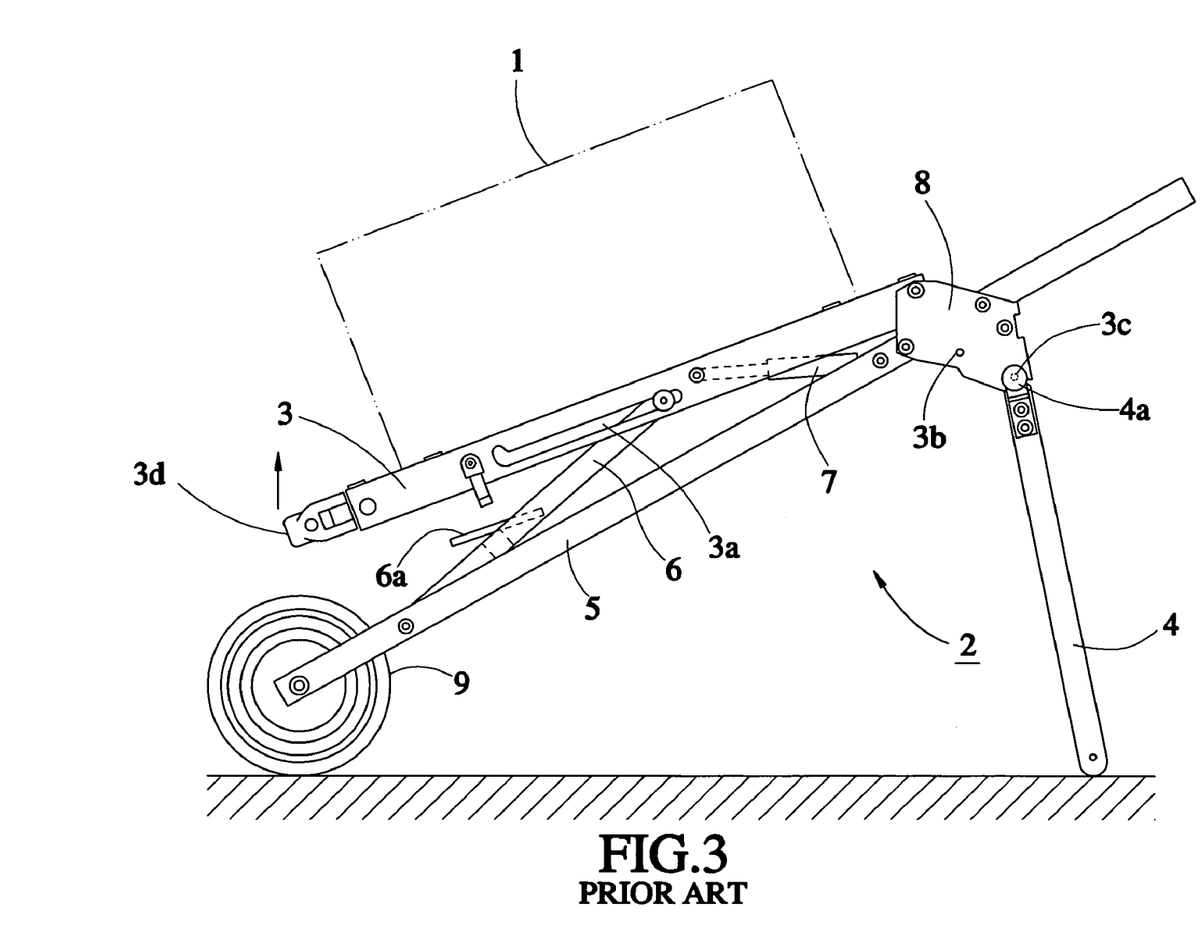
FIG. 3 corresponds to FIG. 2, showing change of the status of the mobile table machine stand from the received position to the extended potion.

FIGS. 1-3 show a conventional mobile table machine stand 2 for supporting a table machine, for example, table saw 1. The mobile table machine stand 2 comprises a platform 3, a pair of first legs 4, a pair of second legs 5, a pair of connecting members 6, two cylinders 7, and two side plates 8. The platform 3 carries the table saw 1, having a sliding slot 3a on each of the two opposite lateral sides and a handle 3d at the front side. The side plates 8 are bilaterally fastened to the rear side of the platform 3. The first legs 4 are respectively pivoted to the side plates 8, and turnable relative to the side plates 8 between the received position shown in FIG. 2 and the extended position shown in FIG. 3. The second legs 5 are respectively pivoted to the side plates 8, each having a top end respectively connected to the two distal ends of a handlebar 5a and a bottom end respectively pivotally mounted with a respective wheel 9. The connecting members 6 each have one end respectively pivoted to the second legs 5 near the respective wheels 9, and the other end respectively slidably coupled to the sliding slots 3a of the platform 3. The cylinders 7 each have the two ends respectively pivoted to the platform 3 and the second legs 5.

The mobile table machine stand 2 is folding collapsible. When collapsed, the mobile stand 2 can be conveniently moved from place to place by means of the wheels 9. However, when wishing to extend out the mobile table machine stand 2 from the collapsed position, the user must remove the respective pins 4a from the respective first holes 3b on the platform 3 and turn the first legs 4 outwards, and then fasten the pins 4a to second holes 3c on the platform 3 to lock the first legs 4. Thereafter, the user must hold the handle 3d to lift the platform 3. When lifting the platform 3, the cylinders 7 impart a push force to facilitate extending action of the second legs 5 and the connecting members 6. However, the user still needs to apply a certain upward force to the handle 3d against the gravity of the table saw 1. Therefore, this operation is not convenient. Further, during lifting of the handle 3d by the user, the user can press the foot on the footplate 6a at connecting members 6 to facilitate extending action of the second legs 5. However, if the lifting force is insufficient to overcome the downward gravity of the table saw 1 or if the mobile table machine stand 2 is improperly operated, the platform 3 may fall down, causing a potential injury of the user's leg. Therefore, this conventional mobile table machine stand is not safe in use.

SUMMARY OF THE INVENTION

The present invention has been accomplished under the circumstances in view. It is one objective of the present invention to provide a support structure for table machine, which has the advantages of high operational safety, high operational convenience, and high structural stability.

To achieve this objective of the present invention, the support structure comprises a top frame unit for the mounting of a table machine and a folding mechanism supporting the top frame unit. The top frame unit has a first pivot point, a second pivot point and a third pivot point orderly arranged at each of left and right sides thereof. The folding mechanism is operable to be alternatively set between an extended position where the top frame unit is substantially kept in horizontal and a received position where the top frame unit is substantially kept in vertical. The folding mechanism comprises a pair of first legs each of which has a first end pivoted to one of the first pivot points of the top frame unit, and a second end having a bearing portion for supporting on the floor; a pair of second legs each of which has a first end pivoted to one of the second pivot points of the top frame unit, and a second end rotatably mounted with a wheel for moving on the floor; a pair of first connecting members each of which has a first end pivoted to one of the third pivot points of the top frame unit, and a second end; a pair of second connecting members each of which has a first end pivoted to one of the second ends of the first connecting members, and a second end pivoted to a middle part of one of the second legs; and a pair of third connecting members each of which has a first end pivoted to a middle part of one of the first connecting members, and a second end pivoted to a middle part of one of the first legs. When the folding mechanism is in the extended position, the first legs and the second legs are kept in a crossed manner. When the folding mechanism is moved from the extended position toward the received position, the first connecting members, the second connecting members and the third connecting members are moved with the second legs toward the first legs. When the folding mechanism is in the received position, the wheels are kept close to the bearing portions of the first legs.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

As shown in FIGS. 4-9, a support structure 100 in accordance with a first preferred embodiment of the present invention is used for supporting thereon a table machine, for example, table saw 200 above the floor 300. The support structure 100 comprises a top frame unit 10, a folding mechanism 20 supporting the top frame unit 10, a pair of wheels 30, a pair of adjusting devices 40, and a locking mechanism 50.

Figure 4:
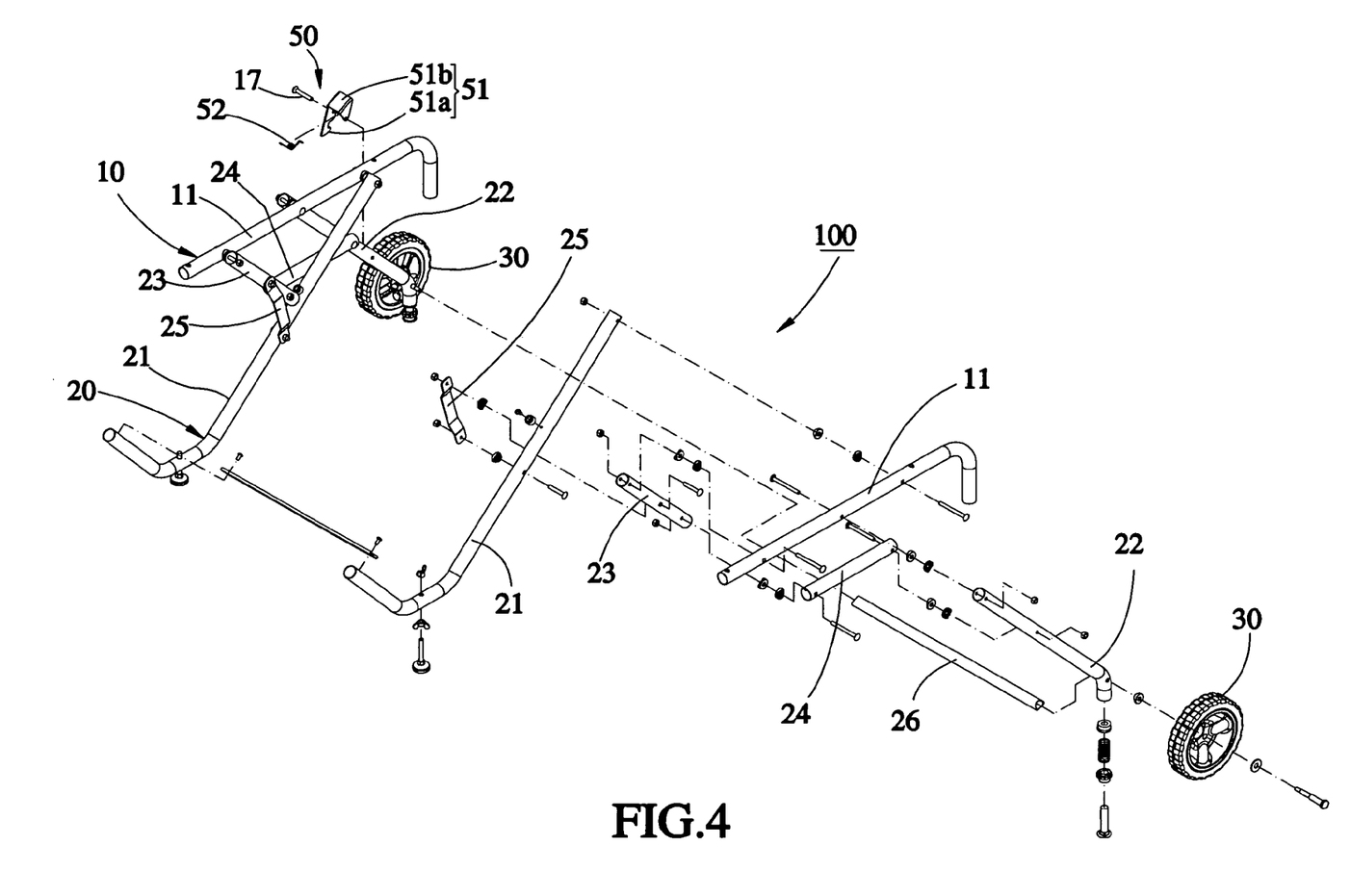
FIG. 4 is an exploded view of a support structure in accordance with a first preferred embodiment of the present invention.

The top frame unit 10 includes two transverse rods 11 that are kept apart and arranged in parallel. Each transverse rod 11 has a front end 10a, a rear end 10b, and a plurality of pivot points, namely, the first pivot point 12, the second pivot point 13 and the third pivot point 14 spaced between the front end 11a and the rear end 10b. The front end 11 curves downwards, thereby forming a grip 15 for the holding of the user's hand. The table saw 200 is fastened to the transverse rods 11 with pins 16.

Figure 5:
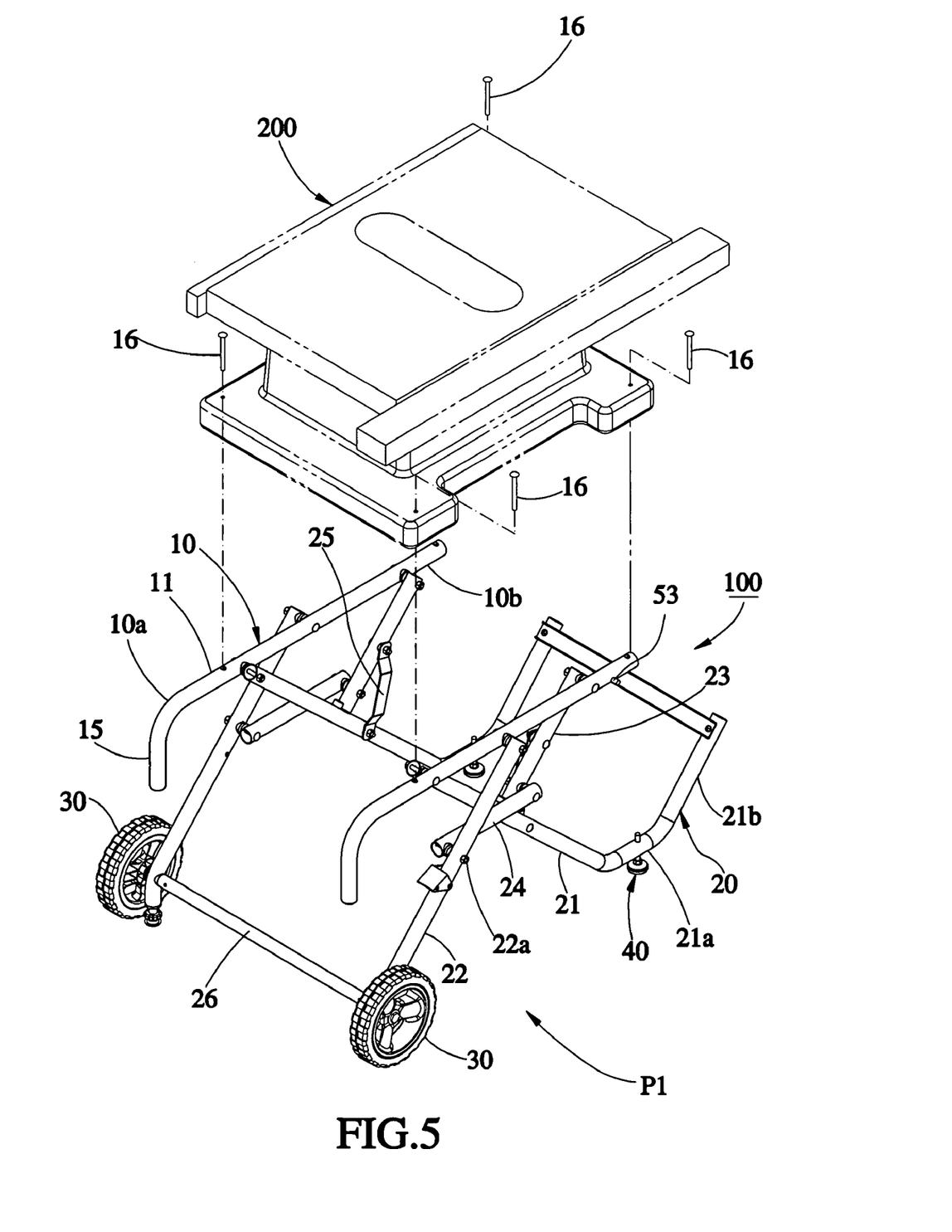
FIG. 5 is a perspective assembly view of the support structure in accordance with the first preferred embodiment of the present invention.
Figure 9:
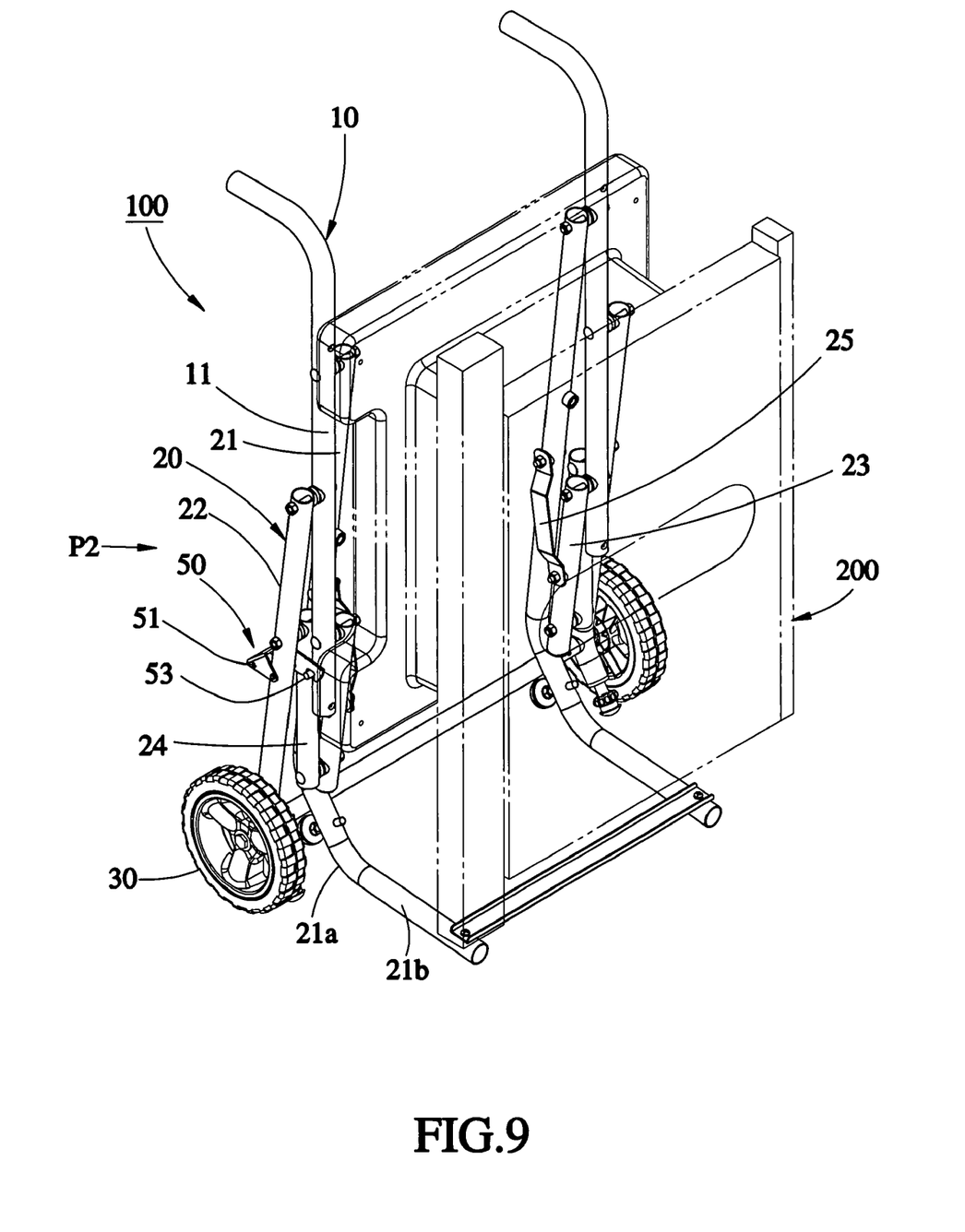
FIG. 9 is a perspective view showing the support structure is in the received position.

The folding mechanism 20 can be alternatively set between the extended position P1 shown in FIG. 5 and the received position P2 shown in FIG. 9. When the folding mechanism 20 is in the extended position P1, the top frame unit 10 is substantially kept in horizontal. When the folding mechanism 20 is in the received position P2, the top frame unit 10 is substantially kept in vertical. The folding mechanism 20 includes a pair of first legs 21, a pair of second legs 22, a pair of first connecting members 23, a pair of second connecting members 24, a pair of third connecting members 25, and a stretcher 26.

Figure 6:
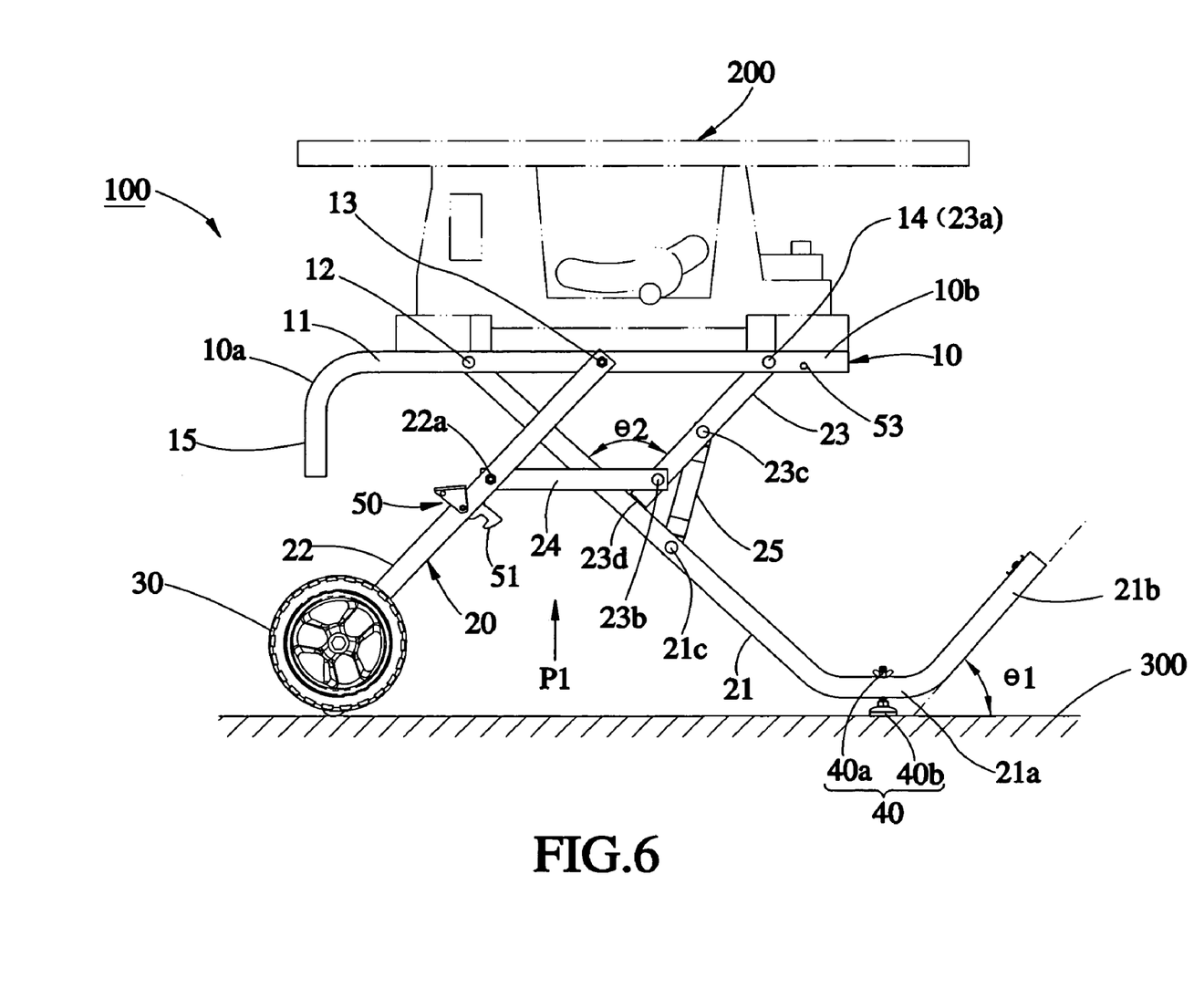
FIG. 6 is a schematic side plan view, showing the support structure is in the extended position.
Figure 7:
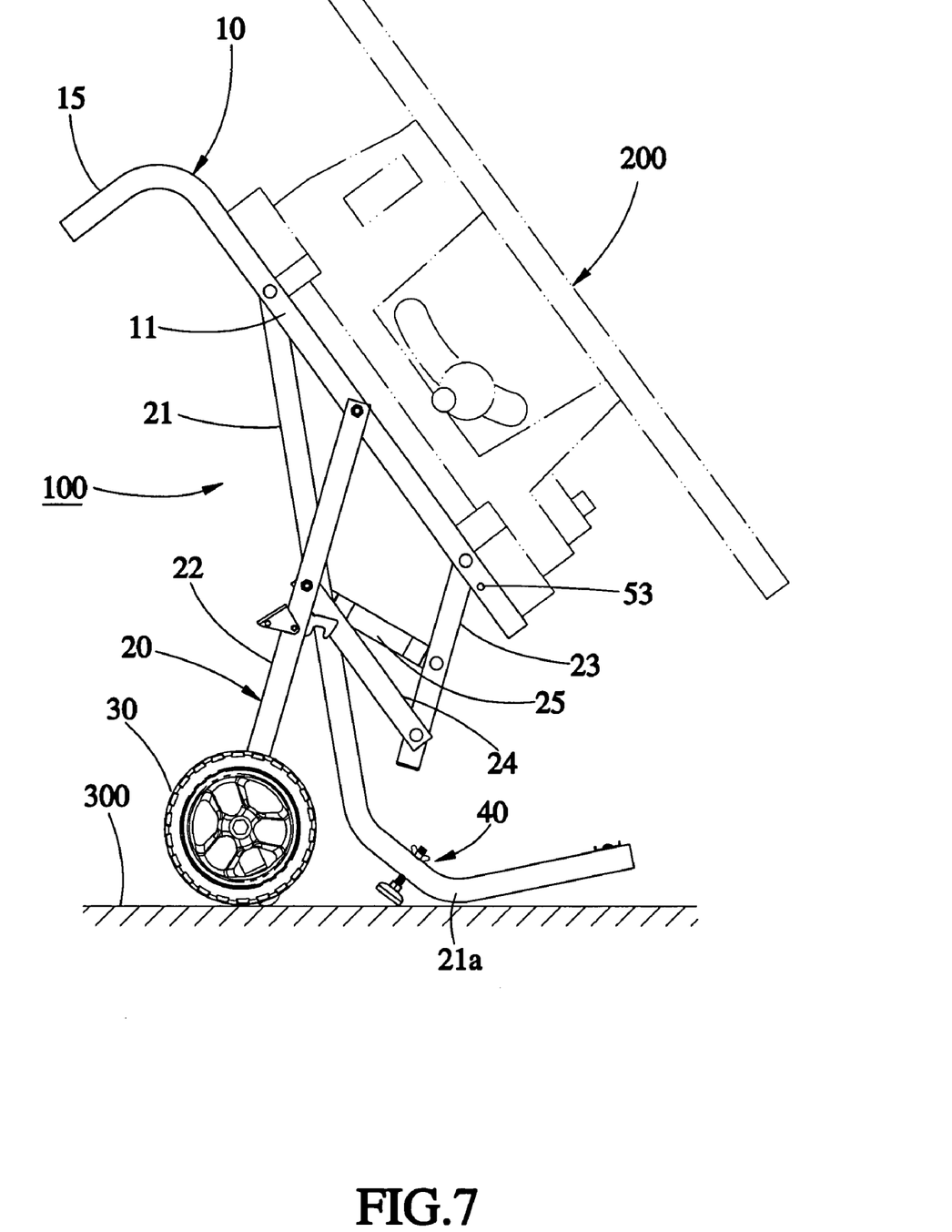
FIG. 7 is another schematic side plan view, showing the support structure is folded.
Figure 8:
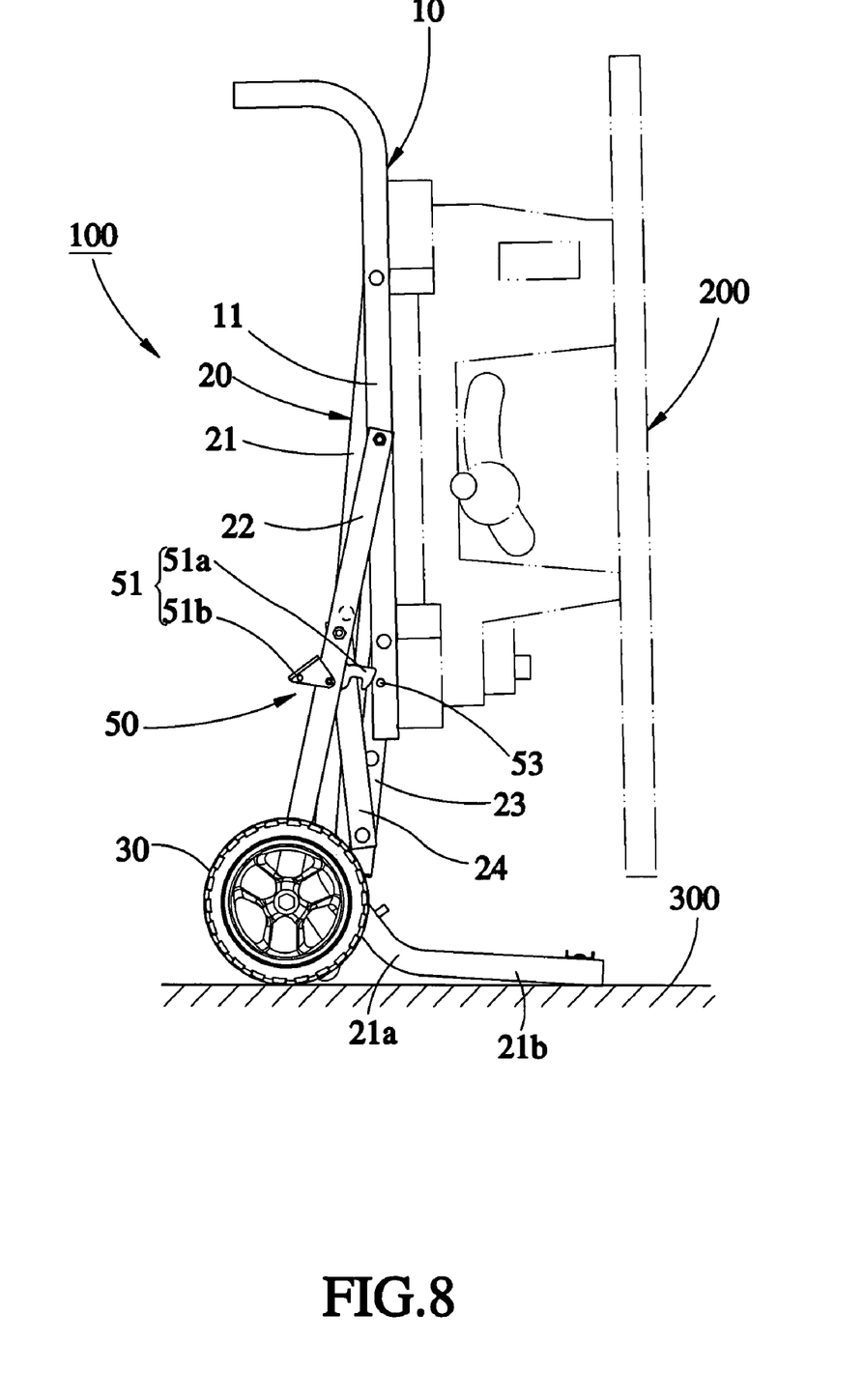
FIG. 8 is still another schematic side plan view, showing the support structure is in the received position.

The first legs 21 each have one end respectively pivoted to the first pivot points 12 of the transverse rods 11 of the top frame unit 10 at an inner side relative to the transverse rods 11 and the other end curved and terminating in a bearing portion 21a and then a stop portion 21b. Further, each first leg 21 has a connecting point 21c on the middle. When the folding mechanism 20 is in the extended position P1, the stop portion 21b defines with the floor 300 an acute angle θ1, as shown in FIG. 6. When the folding mechanism 20 is in the received position P2, the stop portion 21b is stopped at the floor 300, thereby supporting the table machine 200 in vertical, as shown in FIG. 8.

The second legs 22 each have one end respectively pivoted to the second pivot points 13 of the transverse rods 11 of the top frame unit 10 at an outer side relative to the transverse rods 11 and the other end mounted with one of the wheels 30. Each second leg 22 further has a connecting point 22a on the middle. As shown in FIG. 6, the first legs 21 and the second legs 22 are arranged in a crossed manner at this time.

The first connecting members 23 each have a first end 23a and a second end 23b. The first ends 23a of the first connecting members 23 are respectively pivoted to the third pivot points 14 of the transverse rods 11 of the top frame unit 10 at an inner side relative to the transverse rods 11. Each first connecting member 23 further has a connecting point 23c on the middle thereof.

The second connecting members 24 are set between the first legs 21 and the second legs 22, each having one end respectively pivoted the second ends 23b of the first connecting members 23 and the other end respectively pivoted to the connecting points 22a of the second legs 22. As shown in FIG. 6, when the folding mechanism 20 is extended out, the first connecting members 23 are substantially kept in parallel to the second legs 22, and the second connecting members 24 are substantially kept in parallel to the transverse rods 11, thereby constituting a parallel four-bar linkage. At this time, the rear end edge 23d of each of the first connecting members 23 is stopped against the surface of each of the first legs 21 respectively, and the first connecting members 23 define with the first legs 21 a contained angle θ2 about 90° so that the extended folding mechanism 20 supports the table saw 200 steadily above the floor 300.

The third connecting members 25 each have one end respectively pivoted to the connecting points 23c of the first connecting members 23, and the other end respectively pivoted to the connecting points 21c of the first legs 21. The third connecting members 25 reinforce the stability of the connection between the first legs 21 and the first connecting members 23, and work with the first connecting members 23 and the second connecting members 24 to carry the second legs 22 to move toward the first legs 21 when folding up the folding mechanism 20 (see FIGS. 6-8). When the folding mechanism 20 reaches the received position P2 as shown in FIG. 9, the wheels 30 are kept close to the bearing portions 21a of the first legs 21.

The stretchers 26 each have two distal ends respectively fixedly connected to the second legs 22 adjacent to the wheels 30 to reinforce the stability of the connection between the two second legs 22. When extending or receiving the support structure 100, the user can step on the stretchers 26 and hold the grips 15 with the hands, and then apply force to the grips 15 to effectively control the extending or receiving speed of the folding mechanism 20.

When the user holds the grips 15 with the hands to shift the center of gravity toward the first legs 21 and to turn the table saw 200 from the horizontal position toward the vertical position, the grips 15 is gradually lifted and the folding mechanism 20 is gradually received, and by means of the weight of the table saw 200, the user can conveniently change the table saw 200 from the horizontal position to the vertical position (see FIG. 9) for easy movement of the support structure 100 with the able saw 200 to another work place. When the user imparts a downward pressure to the grips 15, the folding mechanism 20 will be forced to extend out again, returning the table saw 200 to the horizontal position for working again (see FIG. 6). The aforesaid receiving and extending operation method prevents the risk of potential accident of the prior art mobile table machine stand due to insufficient applied force from the user's hands. Therefore, the support structure 100 of the present invention has the advantages of high operational safety, high operational convenience, and high structural stability.

Figure 10:
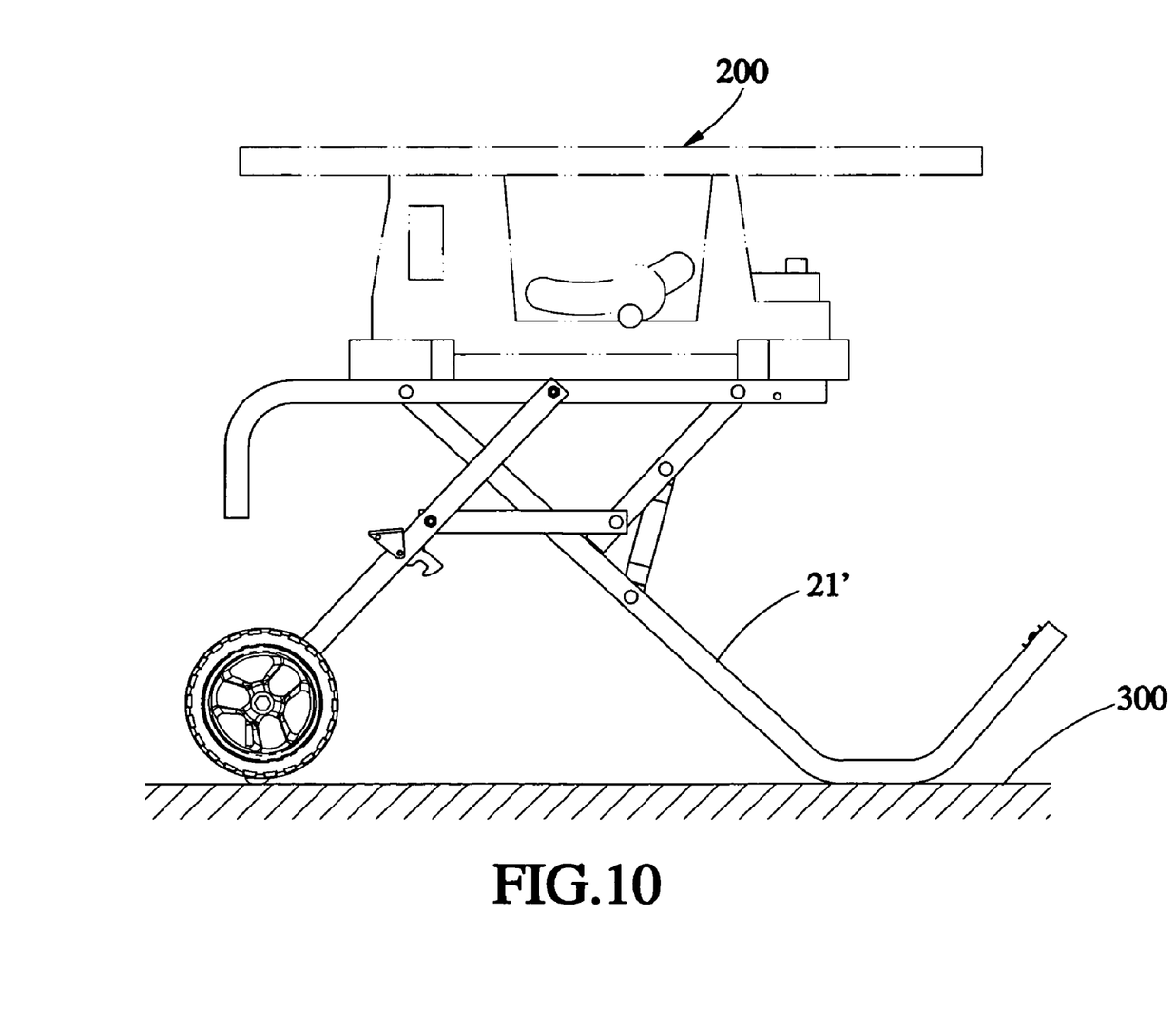
FIG. 10 is a schematic side plan view of a support structure in accordance with a second preferred embodiment of the present invention.

The adjusting devices 40 are respectively installed in the first legs 21 adjacent to the respective bearing portions 21a. According to this embodiment, the adjusting devices 40 are adjusting screws, each having a threaded shank 40a threaded into the corresponding first leg 21 and a head 40b for stopping against the floor 300 (see FIG. 6). By means of rotating the adjusting devices 40 forwards or backwards relative to the respective first legs 21, fine adjustment of the elevation of the support structure 100 is done. It is to be understood that the adjusting devices 40 are only the accessories for enhancing the applicability of the support structure 100, i.e., the adjusting devices 40 are not requisite members of the support structure 100 of the present invention, such that they can be eliminated. FIG. 10 shows a second preferred embodiment of the present invention. According to this second embodiment, the aforesaid adjusting devices 40 are eliminated, and relatively longer first legs 21' are used for direct contact with the floor 300 to substitute the first legs 21 shown in FIGS. 4-9.

Referring to FIGS. 4-9 again, the locking mechanism 50 comprises a retaining member 51, a biasing member, for example, torsional spring 52, and a locating member 53 affixed to one transverse rod 11 at an outer side. A pivot pin 17 is inserted through the retaining member 51 and the torsional spring 52 and one second leg 22 to pivotally secure the retaining member 51 to the associating second leg 22. The retaining member 51 has a hook portion 51a and a press portion 51b at two sides relative to the pivoted point. When the second legs 22 are received to the first legs 21 (see FIG. 8), the smoothly arched outer surface of the hook portion 51a guides the front end of the retaining member 51 over the locating member 53. At this time, the torsional spring 52 imparts a biasing force to the retaining member 51, thereby causing the hook portion 51a of the retaining member 51 to be forced into engagement with the locating member 53 to prevent separation of the first legs 21 and the second legs 22 and to assure operational safety of the support structure 100. On the contrary, when the user imparts a downward pressure to the press portion 51b, the retaining member 51 is biased to disengage the hook portion 51a from the locating member 53, thereby unlocking the folding mechanism 20, so that the folding mechanism 20 can be extended again.

Figure 11:
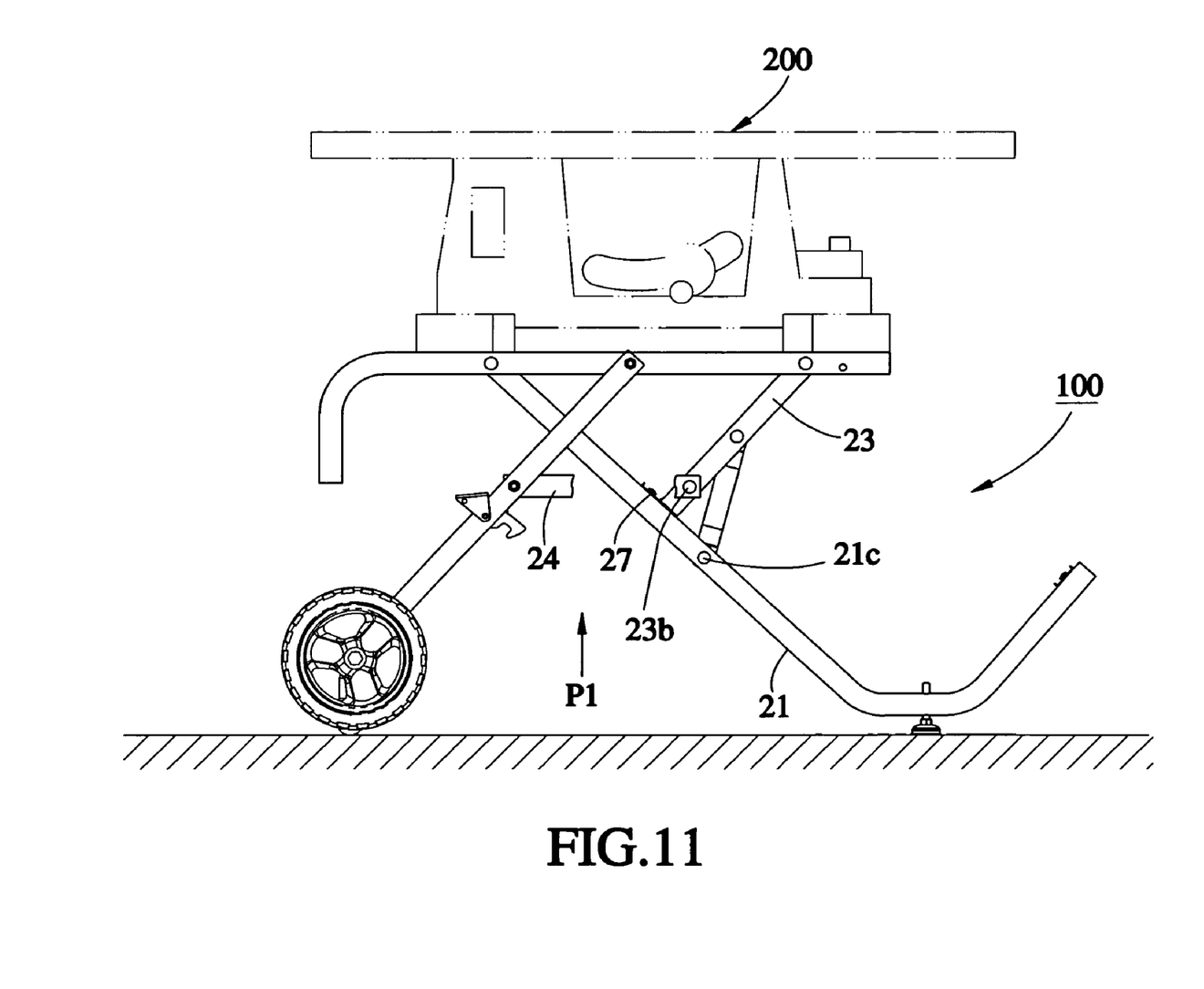
FIG. 11 is a schematic side plan view of a support structure in accordance with a third preferred embodiment of the present invention.

FIG. 11 shows a support structure 100 in accordance with a third preferred embodiment of the present invention. This third embodiment is substantially similar to the aforesaid first embodiment with the exception of an additional stop member 27. As illustrated, the stop member 27 is fixedly connected between the two first legs 21 near the connecting points 21c of the first legs 21 to reinforce the stability of the connection between the two first legs 21. When the support structure 20 is in the extended position P1, the stop member 27 stops the first connecting members 23 in place, assuring high stability and safety of the use of the support structure 100. The stop member 27 can be a flat bar, or formed of two solid blocks respectively affixed to the first legs 21 for stopping the first connecting members 23.

Figure 12:
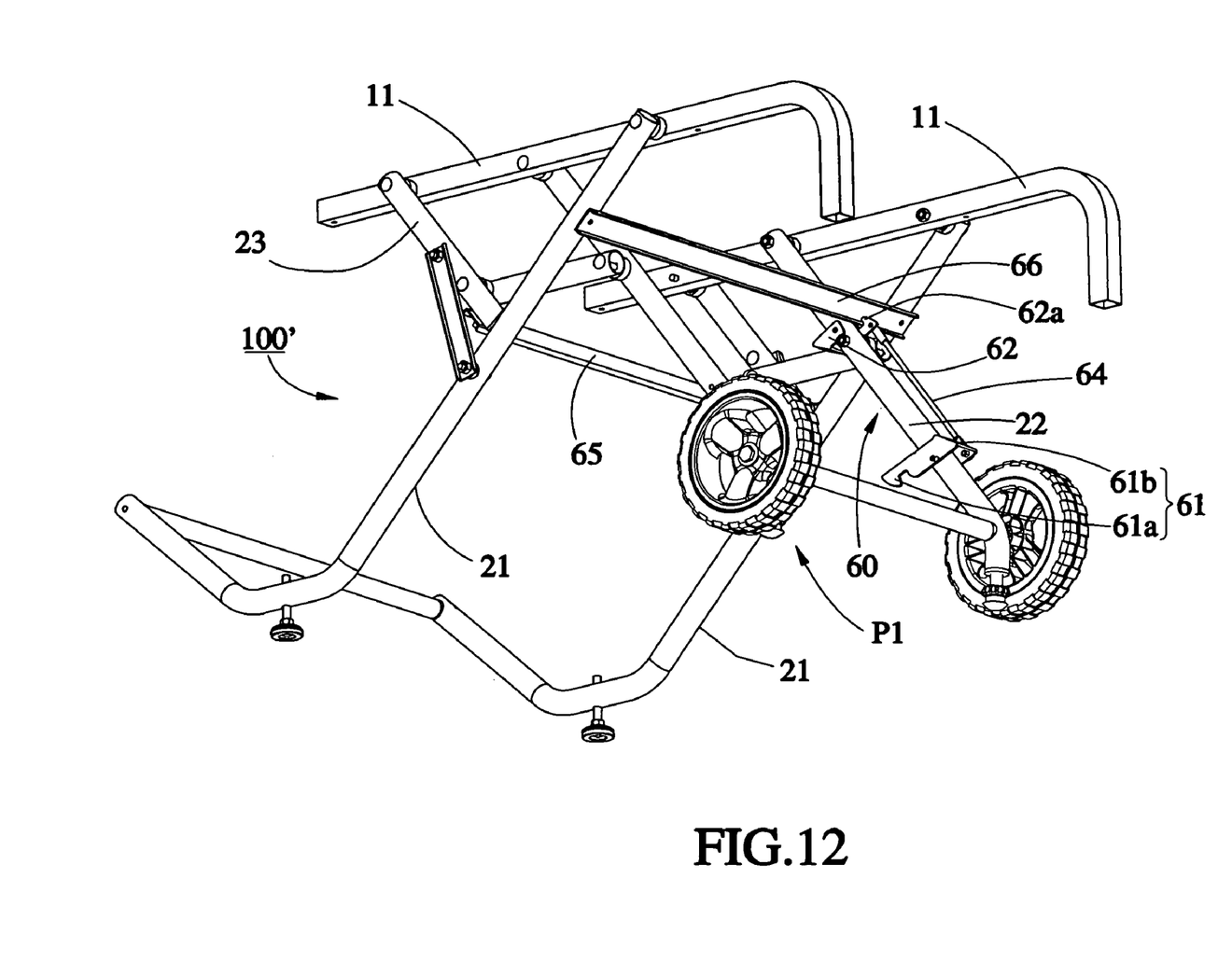
FIG. 12 is a schematic side plan view of a support structure in accordance with a fourth preferred embodiment of the present invention.

FIG. 12 shows a support structure 100' in accordance with a fourth embodiment of the present invention. This fourth embodiment is substantially similar to the aforesaid first embodiment with the exception of the locking mechanism and the connection arrangement of the first and second legs. According to this fourth embodiment, the first legs 21 are respectively pivoted to the transverse rods 11 at an outer side relative to the transverse rods 11; the second legs 22 are respectively pivoted to the transverse rods 11 at an inner side relative to the transverse rods 11; the first connecting members 23 are respectively connected to the transverse rods 11 at an outer side relative to the transverse rods 11; the locking mechanism 60 includes a first retaining member 61, a second retaining member 62, a link 64, a first locating member 65 and a second locating member 66.

The first retaining member 61 and the second retaining member 62 are spaced mounted on one same second leg 22, each having a front hook portion 61a or 62a. The first retaining member 61 further has a rear press portion 61b.

The link 64 is a rod member having one end pivoted to the first retaining member 61 near the press portion 61b and the other end pivoted to the second retaining member 62 near the hook portion 62b.

The first locating member 65 is a flat bar having two distal ends respectively affixed to the first connecting members 23. The second locating member 66 is a blat bar, having two distal ends respectively affixed to the two first legs 21.

Figure 13:
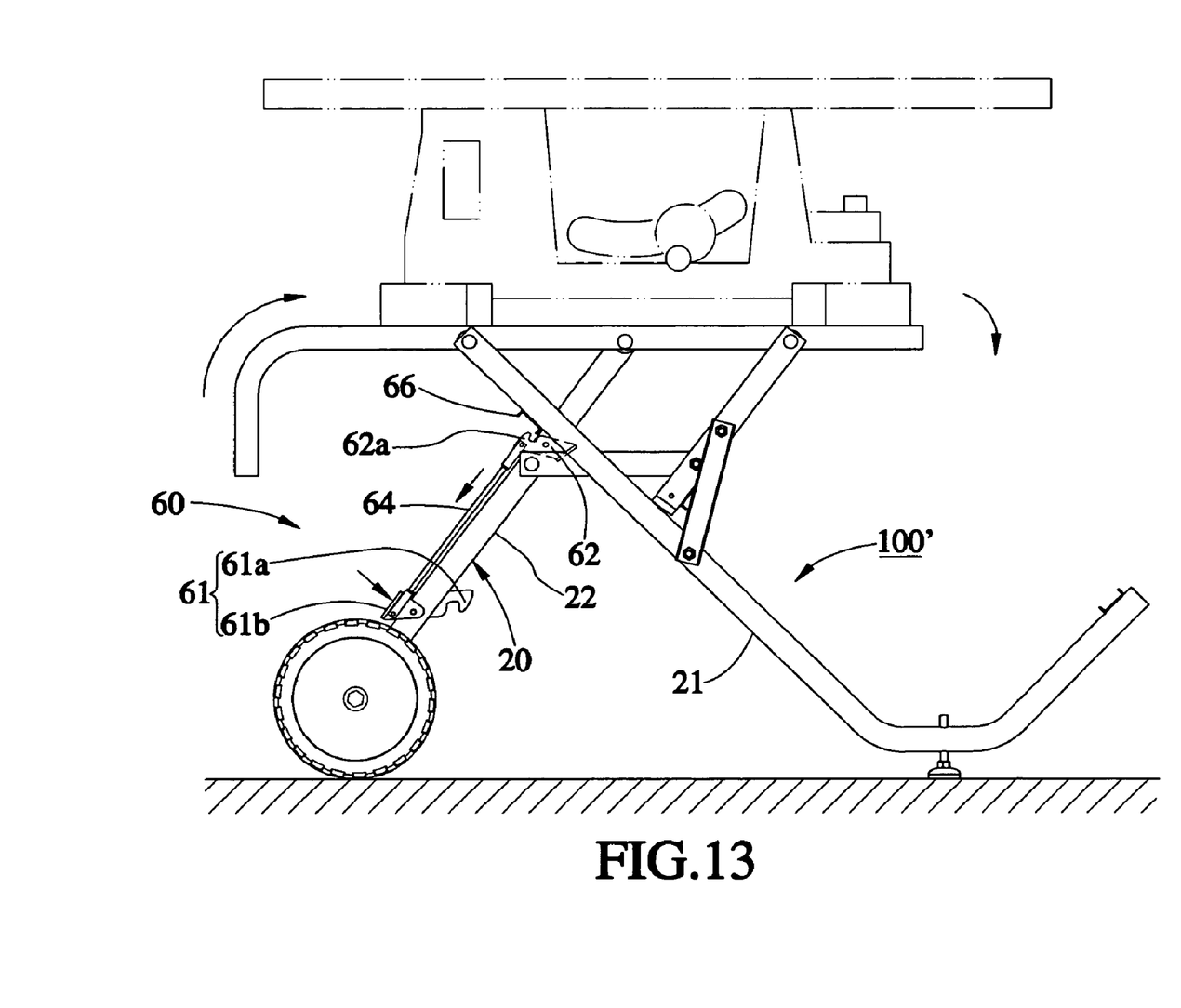
FIG. 13 is a schematic drawing of the support structure in accordance with the fourth preferred embodiment of the present invention, showing disengagement operation of the second retaining member from the second locating member.
Figure 14:
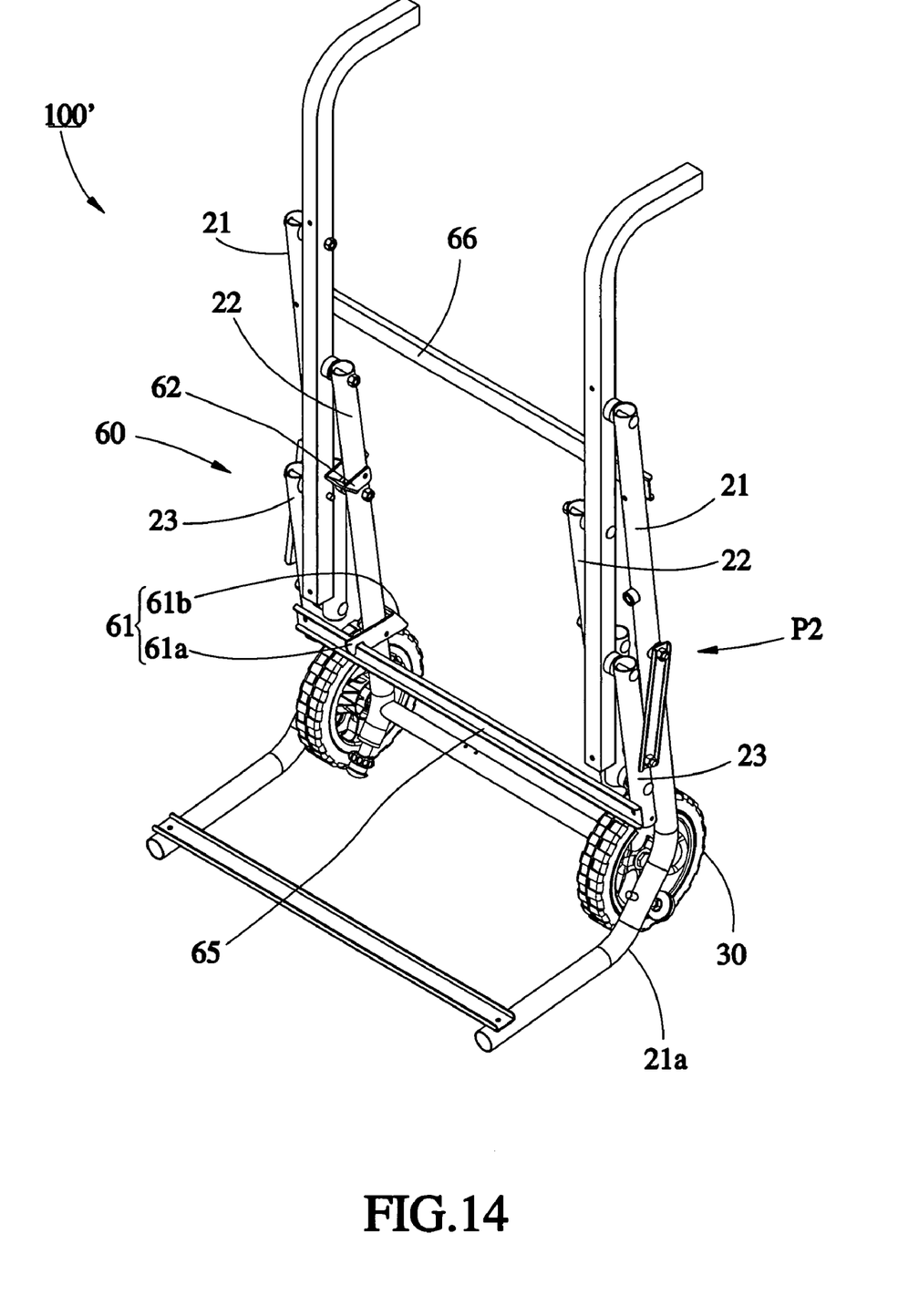
FIG. 14 is a perspective view of the fourth preferred embodiment of the present invention, showing the support structure is in the received position.

When the support structure 100' is in the extended position P1, the hook portion 62a of the second retaining member 62 is hooked on the second locating member 66 to prevent a scissoring action between the first legs 21 and the second legs 22, thereby assuring safety use of the support structure 100'. When wishing to receive the support structure 100', press the press portion 61b of the first retaining member 61 with the foot to bias the first retaining member 61. At this time, the second retaining member 62 is simultaneously biased in the same direction due to the effect of the link 64, and therefore the hook portions 61a and 62a are disengaged from the first locating member 65 and the second locating members 66 (see FIG. 13), allowing folding of the support structure 100' into the received position. When the wheels 30 are approaching the bearing portions 21a of the first legs 21 (see FIG. 14), the front hook portion 61a of the first retaining member 61 is biased by the associating torsional spring (not shown) and forced into engagement with the first locating member 65, thereby locking the support structure 100' in the received position P2 to prevent separation of the first legs 21 and the second legs 22. When the user presses the press portion 61b of the first retaining member 61 with the foot again, the front hook 61a of the first retaining member 61 is disengaged from the first locating member 65, allowing the support structure 100' to be extended out again.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A support structure for supporting a table machine above the floor, comprising:
   a top frame unit for the mounting of the table machine, said top frame unit having a first pivot point, a second pivot point and a third pivot point orderly arranged at each of left and right sides thereof; and
   a. folding mechanism supporting said top frame unit and operable to be alternatively set between an extended position where said top frame unit is substantially kept in horizontal and a received position where said top frame unit is substantially kept in vertical, said folding mechanism comprising:
   a pair of first legs having a pair of first ends respectively pivoted to the first pivot points of said top frame unit, and a pair of second ends each having a bearing portion for supporting on the floor;
   a pair of second legs having a pair of first ends respectively pivoted to the second pivot points of said top frame unit, and a pair of second ends on each of which a wheel is rotatably mounted;
   a pair of first connecting members having a pair of first ends respectively pivoted to said third pivot points of said top frame unit, and a pair of second ends;
   a pair of second connecting members having a pair of first ends respectively pivoted to the second ends of said first connecting members, and a pair of second ends respectively pivoted to middle parts of said second legs; and
   a pair of third connecting members having a pair of first ends respectively pivoted to middle parts of said first connecting members, and a pair of second ends respectively pivoted to middle parts of said first legs; wherein when said folding mechanism is in said extended position, said first legs and said second legs are kept in a crossed manner; when said folding mechanism is moved from said extended position toward said received position, said first connecting members, said second connecting members and said third connecting members are moved with said second legs toward said first legs; when said folding mechanism is in said received position, said wheels are kept close to the bearing portions of said first legs.

2. The support structure as claimed in claim 1, wherein said top frame unit comprises two transverse rods arranged in parallel; one of said first pivot points, one of said second pivot points and one of said third pivot points are formed on one of said two transverse rods; said first legs and said first connecting members are respectively pivoted to said transverse rods at inner sides of said transverse rods; said second legs are respectively pivoted to said transverse rods at outer sides of said transverse rods; when said folding mechanism is in said extended position, said first connecting members are substantially kept in parallel to said second legs, and said second connecting members are substantially kept in parallel to said transverse rods.

3. The support structure as claimed in claim 1, wherein the second end of each of said first legs has a stop portion respectively outwardly curvedly extending from the respective bearing portion, the stop portions of said first legs being supported on the floor when said top frame unit is kept in vertical.

4. The support structure as claimed in claim 1, further comprising a locking mechanism, which locks said first legs to said second legs when said folding mechanism is in said received position.

5. The support structure as claimed in claim 1, further comprising a locking mechanism, said locking mechanism comprising a first hook portion adapted to hook said first legs and said second legs together when said folding mechanism is in said received position, and a second hook portion adapted to secure said first legs and said second legs in said crossed manner when said folding mechanism is in said extended position.

6. The support structure as claimed in claim 1, further comprising at least one stop member fixedly fastened to said first legs for stopping said first connecting members, said first connecting members being stopped at said at least one stop member and defining with said first legs a 90° contained angle when said folding mechanism is in said extended position.

7. The support structure as claimed in claim 4, wherein said locking mechanism comprises a retaining member pivoted to one of said second legs, and a locating member fixedly provided at said top frame unit, said retaining member having a front hook portion, which is hooked on said locating member when said folding mechanism is in said received position.

8. The support structure as claimed in claim 7, wherein said locking mechanism further comprises a biasing member, which imparts a biasing force to said retaining member in a predetermined direction relative to the associating second leg to force said front hook portion into engagement with said locating member when said folding mechanism is moved from said extended position to said received position; said retaining member has a press portion at one side remote from said front hook portion for pressing by the user to disengage said front hook portion from said locating member.

9. The support structure as claimed in claim 5, wherein said locking mechanism comprises a first retaining member, a second retaining member, a first locating member, and a second locating member, said first retaining member and said second retaining member being spacedly pivoted to one of said second legs, said first retaining member having one end terminating in said first hook portion, said second retaining member having one end terminating in said second hook portion, said first locating member having two distal ends respectively affixed to said first connecting members, said second locating member having two distal ends respectively affixed to said first legs, said first hook portion being hooked on said first locating member when said folding mechanism is in said receiving position, said second hook portion being hooked on said second locating member when said folding mechanism is in said extended position.

10. The support structure as claimed in claim 9, wherein said locking mechanism further comprises a link and a biasing member, said link being coupled between said first retaining member and said second retaining member, said first retaining member having a press portion extended from one end thereof remote from said first hook portion, said biasing member imparting a biasing force to said first retaining member in a predetermined direction; said first hook portion being disengaged from said first locating member when said folding mechanism is in said received position and when an external force is applied to said press portion, said second hook portion being disengaged from said second locating member when said folding mechanism is in said extended position and when an external force is applied to said press portion.

* * * * *